(12) United States Patent  (10) Patent No.: US 7,538,921 B2
Someno  (45) Date of Patent: May 26, 2009

(54) HOLOGRAM REPRODUCING APPARATUS

(75) Inventor: Yoshihiro Someno, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 215 days.

(21) Appl. No.: 11/596,269

(22) PCT Filed: May 10, 2005

(86) PCT No.: PCT/JP2005/008527

§ 371 (c)(1),
(2), (4) Date: Nov. 10, 2006

(87) PCT Pub. No.: WO2005/111740

PCT Pub. Date: Nov. 24, 2005

(65) Prior Publication Data

US 2007/0223072 A1    Sep. 27, 2007

(30) Foreign Application Priority Data

May 18, 2004  (JP) .............................. 2004-147301

(51) Int. Cl.
*G03H 1/22* (2006.01)
(52) U.S. Cl. .............................. 359/32; 359/35; 359/31
(58) Field of Classification Search .................. 359/32, 359/31, 2, 35
See application file for complete search history.

(56) References Cited

U.S. PATENT DOCUMENTS

| | | | | |
|---|---|---|---|---|
| 5,128,780 A | * | 7/1992 | Smith | ........................ 359/24 |
| 5,570,207 A | * | 10/1996 | Chang | ........................ 359/2 |
| 6,292,279 B1 | * | 9/2001 | Matsuyama | ........................ 359/35 |
| 7,081,977 B2 | * | 7/2006 | Kim | ........................ 359/10 |

FOREIGN PATENT DOCUMENTS

| | | |
|---|---|---|
| EP | 1507178 A1 | 2/2005 |
| JP | 08-146862 | 6/1996 |
| JP | 2000-162950 | 6/2000 |
| JP | 2001-093157 | 4/2001 |

OTHER PUBLICATIONS

International Search Report dated Aug. 23, 2005 from corresponding International Application No. PCT/JP2005/008527.

* cited by examiner

*Primary Examiner*—Audrey Y Chang
(74) *Attorney, Agent, or Firm*—Beyer Law Group LLP

(57) ABSTRACT

A compact and low-cost hologram reproducing apparatus with a simple mechanism is provided.

A light source 1 and a lens 11 for generating parallel light are provided on an inner surface of a housing 5. By changing the angle of a biaxially driven galvanometer mirror 2 provided at an appropriate position opposing the light source 1 and the lens 11, reflected light is applied two-dimensionally, in the vertical and horizontal directions, on a recording element 3 mounted below and adjacent to the housing, and is entered as reference light in holograms. Further, light beams exiting from the holograms are received at the same optimal position on a light-receiving element 4 disposed in an upper part of the housing. The received light is subjected to data decoding so as to reproduce read-only holograms.

6 Claims, 2 Drawing Sheets

HOLOGRAM REPRODUCING APPARATUS

TECHNICAL FIELD

The present invention relates to a hologram reproducing apparatus that reads information from a recording medium on which the information is recorded by a hologram, and more particularly, to a hologram reproducing apparatus in which reference light for reading enters a recording medium while changing the angle of a biaxially driven galvanometer mirror.

BACKGROUND ART

Conventionally, storage apparatuses for recording information by using the hologram principle are known. A hologram is formed on a recording medium by interference between reference light and object light. During reproduction, original information is reproduced by entering reference light, which has the same wavelength and angle as those during writing, into the hologram.

A hologram storage medium is characterized in high density and large capacity. Further, multiplexing recording of information can be performed by changing the angle of reference light or changing the wavelength of the reference light, and this can further increase the density. While conventional electronic storage apparatuses sequentially read information, information can be read from a hologram in parallel at once. This can achieve high data processing. Such a hologram reproducing apparatus is disclosed in, for example, Patent Document 1.

Patent Document 1: Japanese Unexamined Patent Application Publication No. 2001-93157

DISCLOSURE OF INVENTION

Problems to be Solved by the Invention

A hologram reproducing apparatus is required to be compact and highly reliable, and therefore, it is necessary to minimize complicated structures. Conventional hologram reproducing apparatuses have generally adopted a method for two-dimensionally driving a mount for a recording medium in order to precisely control the application position of reference light. For this reason, the hologram reproducing apparatuses are complicated, including positioning control on the recording medium.

The present invention has been made in view of the above-described problems, and an object of the invention is to provide a compact and low-cost hologram reproducing apparatus with a simplified mechanism.

Means for Solving the Problem

In order to overcome the above-described problems, a hologram reproducing apparatus according to the present invention reproduces information recorded in holograms that are two-dimensionally arranged on a recording medium. The hologram reproducing apparatus includes a light source for emitting light into the holograms; a light-receiving element for receiving light beams exiting from the holograms; and a movable mirror unit disposed at a position such as to oppose the light source, and including a reflecting mirror for reflecting the light from the light source and a driving unit for biaxially driving the reflecting mirror. The holograms are provided so that the light beams exit toward the light-receiving element. The angle of the reflecting mirror is changed by the driving unit so that the light from the light source can enter the holograms.

Advantages of the Ivention

According to the present invention, since the incident angle of reading reference light is changed by the movable mirror unit in a state in which the light source, the recording medium, and the light-receiving element are fixed, it is unnecessary to provide a mechanism for two-dimensionally driving the recording medium (holograms), and the configuration is simplified. This can simplify the hologram reproducing apparatus and can reduce the size and cost of the apparatus.

According to the present invention, the light-receiving element receives the light beams exiting from the holograms at the same position. Therefore, the holograms can be reproduced only by two-dimensionally controlling the reflection angle of the movable mirror unit.

According to the present invention, since the driving unit in the movable mirror unit drives the reflecting mirror along two axes orthogonal to the light from the light source, the reflection angle can be controlled easily.

According to the present invention, since the light source generates light beams having a plurality of wavelengths, it is possible to reproduce holograms recorded on the recording medium by wavelength multiplexing.

Figure 1:
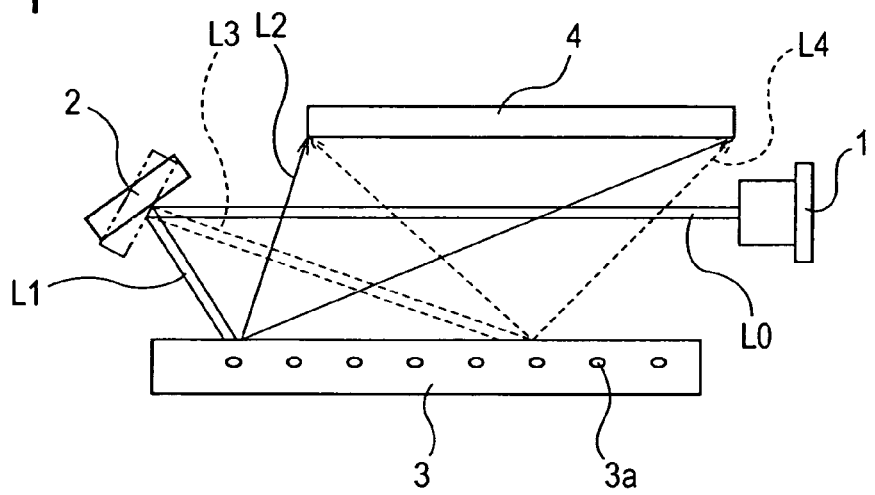
FIG. 1 is a conceptual side view of a hologram reproducing apparatus according to an embodiment of the present invention.

REFERENCE NUMERALS 1 light source
2 galvanometer mirror
3 recording medium
3a hologram
4 light receiver
5 housing
11 collimator lens
12 reflecting mirror
13 driving unit

BEST MODE FOR CARRYING OUT THE INVENTION

Figure 2:
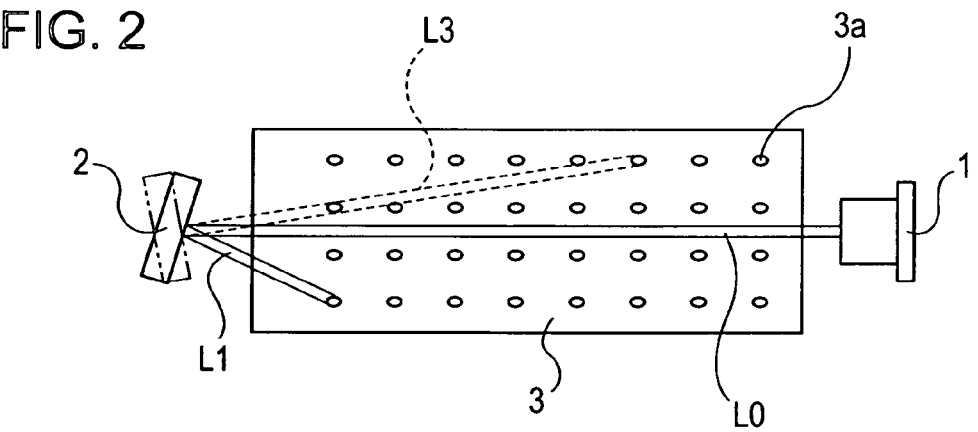
FIG. 2 is a conceptual plan view of the hologram reproducing apparatus according to the embodiment of the present invention.

An embodiment of the present invention will be described in detail with reference to the drawings. FIGS. 1 and 2 are conceptual views of a hologram reproducing apparatus according to this embodiment. FIG. 1 is a side view, and FIG. 2 is a plan view. As shown in these figures, the hologram reproducing apparatus basically includes a light source 1 for mainly generating reading reference light, a galvanometer mirror 2 serving as a movable mirror unit for reflecting the light from the light source 1, a recording medium 3 in which light from the galvanometer mirror 2 is entered, and a light receiver 4 for receiving light exiting from the recording medium 3.

A laser is used as the light source 1. When a plurality of holograms 3a provided on the recording medium 3 to be reproduced are formed with single-wavelength light, the laser uses single-wavelength light having the same wavelength as that of reference light used in writing. When the holograms 3a are formed by wavelength multiplexing, a wavelength-variable layer that can generate light corresponding to a plurality of wavelengths used in writing is used.

The galvanometer mirror 2 totally reflects light from the light source 1, and is biaxially driven by a driving unit. By this biaxial driving, the light reflection angle can be changed two-dimensionally. A plurality of holograms 3a are provided on the recording medium 3, and are arranged two-dimensionally. A CMOS sensor or a CCD is used as the light receiver 4, and can read data reproduced from the holograms 3a.

A description will now be given of the incidence of light on the holograms 3a of the recording medium 3. As shown in FIG. 1, light from the light source 1 is designated as L0. The light L0 reaches the galvanometer mirror 2 disposed at an appropriate position opposing the light source 1. When light totally reflected by the surface of the galvanometer mirror 2 is designated as L1, the light L1 reaches a specific hologram 3a of the recording medium 3 placed below. The light incident on the hologram 3a reproduces information contained in the hologram 3a, and serves as light L2. The light L2 exits upward such as to spread, and is received by the light receiver 4.

By changing the angle of the galvanometer mirror 2, the light L0 from the light source is reflected by the galvanometer mirror 2 at different angles. When the angle of the galvanometer mirror 2 is changed into a state shown by a dotted line in FIG. 1, light reflected by the galvanometer mirror 2 serves as light L3, and reaches a specific hologram 3a different from the hologram for the light L1. The light incident on the hologram 3a reproduces information contained in the hologram 3a, and is received as light L4 by the light receiver 4.

The holograms 3a are formed so that light from each hologram 3a exits toward the light receiver 4. That is, when the holograms 3a are formed, the angle of reference light is set at an angle such that the reference light passes through the galvanometer mirror 2, as viewed from a writing position, and in contrast, the angle of object light is set at an angle such that the object light passes through the light receiver 4, as viewed from the writing position. Consequently, information recorded in the holograms 3a can be reproduced at the light receiver 4 by reference light from the galvanometer mirror 2. Conversely, the light receiver 4 receives light exiting from the holograms 3a at the same position.

As shown in FIG. 2, the angle of the galvanometer mirror 2 is also changed in a direction orthogonal to the above-described change direction. By changing the angle of the galvanometer mirror 2 centered on these two axes, light can enter any of the holograms 3a that are two-dimensionally arranged on the recording medium 3. The entry of light can be performed position-sequentially or by random access.

When a hologram 3a recorded on the recording medium 3 by wavelength multiplexing is reproduced, the angle of the galvanometer mirror 2 is also changed along the two axes in order for light to be incident on the hologram 3a, in a manner similar to the above. In addition, the wavelength of light from the light source 1 is sequentially changed, whereby multiplexed information can be reproduced sequentially.

Figure 3:
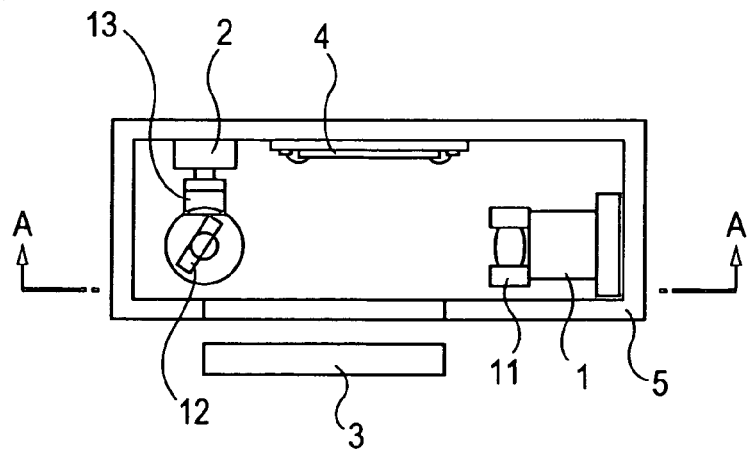
FIG. 3 is a side view of the hologram reproducing apparatus according to the embodiment of the present invention.
Figure 4:
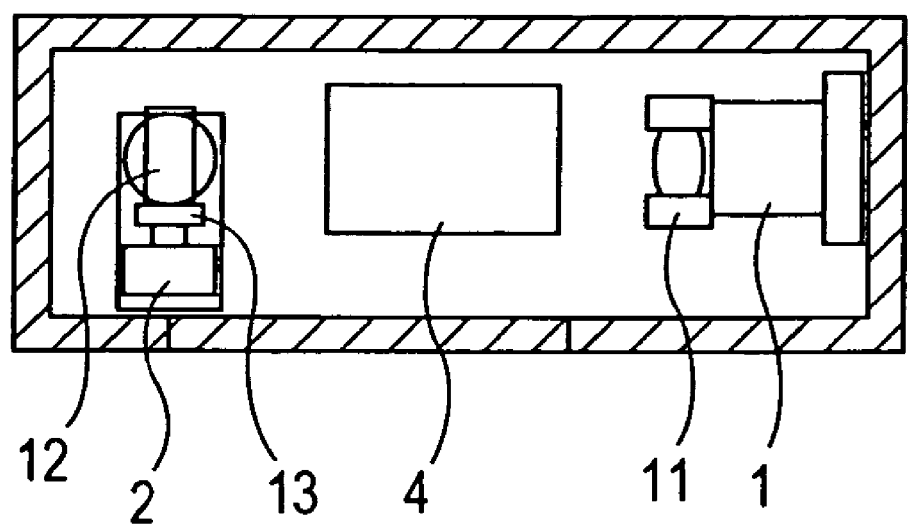
FIG. 4 is a cross-sectional view, taken along line A-A in FIG. 3.

FIGS. 3 and 4 are specific structural views of the hologram reproducing apparatus according to this embodiment. FIG. 3 is a side view, and FIG. 4 is a cross-sectional view, taken along line A-A in FIG. 3. As shown in these figures, the hologram reproducing apparatus is entirely contained in a housing 5, and the light source 1, the galvanometer mirror 2, and the light receiver 4 serving as constituents are mounted on an inner surface of the housing 5. The recording medium 3 is mounted below and adjacent to the hologram reproducing apparatus.

A popular laser is used as the light source 1. Since light emitted from the laser is divergent light, a collimator lens 11 is provided adjacent to the laser so as to collimate the divergent light. The laser light passing through the collimator lens 11 reaches the galvanometer mirror 2 as parallel light.

The galvanometer mirror 2 includes a reflecting mirror 12 for totally reflecting light, and a driving unit 13 for biaxially driving the reflecting mirror 12. The driving unit 13 is formed of a servo mechanism that drives the reflecting mirror 12 along two axes orthogonal to light from the light source 1, and can two-dimensionally set the angle of the reflecting mirror 12 at a desired angle. That is, with biaxial driving by the driving unit 13, the reflecting mirror 12 sequentially enters light from the light source 1 in the holograms 3a, thus reproducing information recorded on the holograms 3a.

The light receiver 4 is provided on an upper surface of the housing 5, and opposes the recording medium 3. Since light beams are emitted from all the holograms 3a of the recording medium 3 to the same position, as described above, information recorded on the holograms 3a can be reproduced without moving the recording medium 3 or the light receiver 4.

In this way, light from the light source 1 is entered in the holograms 3a two-dimensionally arranged on the recording medium 3 by biaxially driving of the galvanometer mirror 2. Therefore, the constituents other than the galvanometer mirror 2 are not driven, but can be fixed. That is, since there is no need to move the recording medium 3, the hologram reproducing apparatus can have a simple configuration, and the cost can be reduced.

While the embodiment of the present invention has been described above, the present invention is not applied only to this embodiment, but is also applicable to various applications within the technical scope of the invention. For example, while the holograms 3a are arranged in the form of a tetragonal lattice in this embodiment, as shown in FIG. 2, the arrangement manner of the holograms 3a is not limited thereto. Information can be reproduced by the biaxially driven galvanometer mirror 2 as long as the holograms 3a are arranged two-dimensionally.

The invention claimed is:

1. A hologram reproducing apparatus for reproducing information recorded in a plurality of holograms that are two-dimensionally arranged on a recording medium, the apparatus comprising:
   a light source for emitting light into the holograms;
   a light-receiving element for receiving reflected light beams exiting from the holograms; and
   a movable mirror unit disposed at a position such as to oppose the light source, the movable mirror unit including:
      a reflecting mirror for reflecting the light from the light source into incident light, and
      a driving unit for biaxially driving the reflecting mirror,
   wherein the holograms are provided such that the reflected light beam exits from each hologram toward the light-receiving element,
   wherein the angle of the reflecting mirror is changed by the driving unit so that the incident light enters the holograms, the incident light reaching a different hologram at a different position on the recording medium as the angle of the reflecting mirror changes,
   and wherein the reflecting mirror rotates around two axes orthogonal to the light from the light source.

2. The hologram reproducing apparatus according to claim 1, wherein the light-receiving element receives the reflected light beams at a fixed position.

3. The hologram reproducing apparatus according to claim 1, wherein the light-receiving element and the recording medium oppose each other in a direction orthogonal to the light emitted from the light source.

4. The hologram reproducing apparatus according to claim 3, wherein the light source, the light-receiving element, and the movable mirror unit are mounted in the same housing.

5. The hologram reproducing apparatus according to claim 1, wherein the movable mirror unit is a galvanometer mirror.

6. The hologram reproducing apparatus according to claim 1, wherein the light source generates light beams having a plurality of wavelengths so as to reproduce holograms recorded on the recording medium by wavelength multiplexing.

* * * * *